(12) United States Patent
Weber et al.

(10) Patent No.: US 8,811,155 B2
(45) Date of Patent: Aug. 19, 2014

(54) SYSTEM AND METHOD FOR COMPENSATING FOR A SATELLITE GATEWAY FAILURE

(75) Inventors: Barry Jay Weber, Carmel, IN (US); Gary Robert Gutknecht, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 557 days.

(21) Appl. No.: 11/794,602

(22) PCT Filed: Oct. 26, 2005

(86) PCT No.: PCT/US2005/038989
§ 371 (c)(1),
(2), (4) Date: Jun. 28, 2007

(87) PCT Pub. No.: WO2007/050079
PCT Pub. Date: May 3, 2007

(65) Prior Publication Data
US 2010/0027411 A1    Feb. 4, 2010

(51) Int. Cl.
| H04L 12/28 | (2006.01) |
| H04L 1/22 | (2006.01) |
| H04L 29/14 | (2006.01) |
| H04H 40/90 | (2008.01) |
| H04N 7/20 | (2006.01) |
| H04L 12/24 | (2006.01) |

(52) U.S. Cl.
CPC ............... *H04N 7/20* (2013.01); *H04H 40/90* (2013.01); *H04L 41/0668* (2013.01)
USPC ........... 370/220; 370/216; 370/217; 370/218; 370/219; 370/401; 714/100; 714/2; 714/3; 714/4.1; 714/4.11

(58) Field of Classification Search
CPC .......... H04L 41/0654; H04L 41/0668; H04W 40/34; H04W 88/16; H04W 92/045; H04H 40/90; H04H 20/74; H04H 7/10
USPC ................. 370/216, 217, 401, 218, 219, 220; 714/100, 2, 3, 4.1, 4.11
See application file for complete search history.

(56) References Cited

U.S. PATENT DOCUMENTS 5,073,930 A    12/1991  Green et al.
5,822,312 A *  10/1998  Peach et al. .................. 370/323
(Continued)

FOREIGN PATENT DOCUMENTS

JP    11502687       3/1999
JP    2002-531017    6/2000
(Continued)

OTHER PUBLICATIONS

International Search Report, dated Aug. 17, 2006.

*Primary Examiner* — Ayaz Sheikh
*Assistant Examiner* — Tarell Hampton
(74) *Attorney, Agent, or Firm* — Robert D. Shedd; Vincent E. Duffy; James McKenzie

(57) ABSTRACT

The disclosed embodiments relate to a system and method for compensating for a satellite gateway failure. There is provided a system comprising a first satellite gateway, and a second satellite gateway (14) coupled to the first satellite gateway and configured to automatically redistribute transponders assigned to the first satellite gateway to create a new transponder allocation if the first satellite gateway fails.

19 Claims, 4 Drawing Sheets

| SATELLITE | TRANSPONDERS AVAILABLE | TRANSPONDER COVERAGE WITH THREE SATELLITE GATEWAYS | TRANSPONDER COVERAGE WITH TWO SATELLITE GATEWAYS | TRANSPONDER COVERAGE WITH ONE SATELLITE GATEWAY |
|---|---|---|---|---|
| 101 | 32 | 48 | 40 | 16 |
| 110/119 | 14 | 32 | 16 | 8 |
| 95 | 3 | 16 | 8 | 8 |

(56) References Cited

U.S. PATENT DOCUMENTS

| | | |
|---|---|---|
| 6,219,546 B1 * | 4/2001 | Valentine et al. ............. 455/428 |
| 6,658,013 B1 * | 12/2003 | de Boer et al. ................ 370/404 |
| 2004/0107436 A1 | 6/2004 | Ishizaki |
| 2004/0172658 A1 * | 9/2004 | Rakib et al. ................... 725/120 |
| 2005/0254483 A1 * | 11/2005 | Factor et al. .................. 370/352 |
| 2006/0018345 A1 * | 1/2006 | Nadarajah et al. ............ 370/486 |
| 2006/0167818 A1 * | 7/2006 | Wentker et al. ................. 705/64 |
| 2010/0268085 A1 | 10/2010 | Kruecker et al. |

FOREIGN PATENT DOCUMENTS

| | | |
|---|---|---|
| JP | 2004186822 | 7/2004 |
| WO | WO 96/31086 | 10/1996 |

\* cited by examiner

| SATELLITE | TRANSPONDERS AVAILABLE | TRANSPONDER COVERAGE WITH THREE SATELLITE GATEWAYS | TRANSPONDER COVERAGE WITH TWO SATELLITE GATEWAYS | TRANSPONDER COVERAGE WITH ONE SATELLITE GATEWAY |
|---|---|---|---|---|
| 101 | 32 | 48 | 40 | 16 |
| 110/119 | 14 | 32 | 16 | 8 |
| 95 | 3 | 16 | 8 | 8 |

Fig. 4

SYSTEM AND METHOD FOR COMPENSATING FOR A SATELLITE GATEWAY FAILURE

This application is a National Stage Application and claims the benefit, under 35 U.S.C. §365 of International Application PCT/US2005/38989 filed Oct. 26, 2005, which was published in accordance with PCT Article 21(2) on May 3, 2007 in English.

FIELD OF THE INVENTION

The present invention relates generally to transmitting video or other digital data over a network. More specifically, the present invention relates to a system for compensating a satellite gateway failure in a multi-dwelling unit satellite television and data system.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

As most people are aware, satellite television systems, such as DirecTV, have become much more widespread over the past few years. In fact, since the introduction of DirecTV in 1994, more than twelve million American homes have become satellite TV subscribers. Most of these subscribers live in single-family homes where satellite dishes are relatively easy to install and connect. For example, the satellite dish may be installed on the roof of the house.

Many potential subscribers, however, live or temporarily reside in multi-dwelling units ("MDUs"), such as hotels or high-rise apartment buildings. Unfortunately, there are additional challenges involved with providing satellite TV services to the individual dwelling units within an MDU. It may be impractical and/or extremely expensive to provide and connect one satellite dish per dwelling. For example, in a high-rise apartment building with one thousand apartments, it may be impractical to mount one thousand satellite dishes on the roof of the building. Some conventional systems have avoided these issues by converting the digital satellite television signal into an analog signal that can be transmitted via a single coaxial cable to a plurality of dwellings. These systems, however, offer limited channels, have reduced quality compared to all-digital systems, and cannot provide the satellite TV experience to which users who live in single family homes are accustomed.

An improved system and/or method for providing satellite TV to a multi-dwelling unit is desirable.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for compensating for a satellite gateway failure. There is provided a system comprising a first satellite gateway, and a second satellite gateway coupled to the first satellite gateway and configured to automatically redistribute transponders assigned to the first satellite gateway to create a new transponder allocation if the first satellite gateway fails.

BRIEF DESCRIPTION OF THE DRAWINGS

Advantages of the invention may become apparent upon reading the following detailed description and upon reference to the drawings in which:

FIG. 4 is a chart illustrating an exemplary distribution of satellite transponder coverage in accordance with one embodiment of the present invention.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
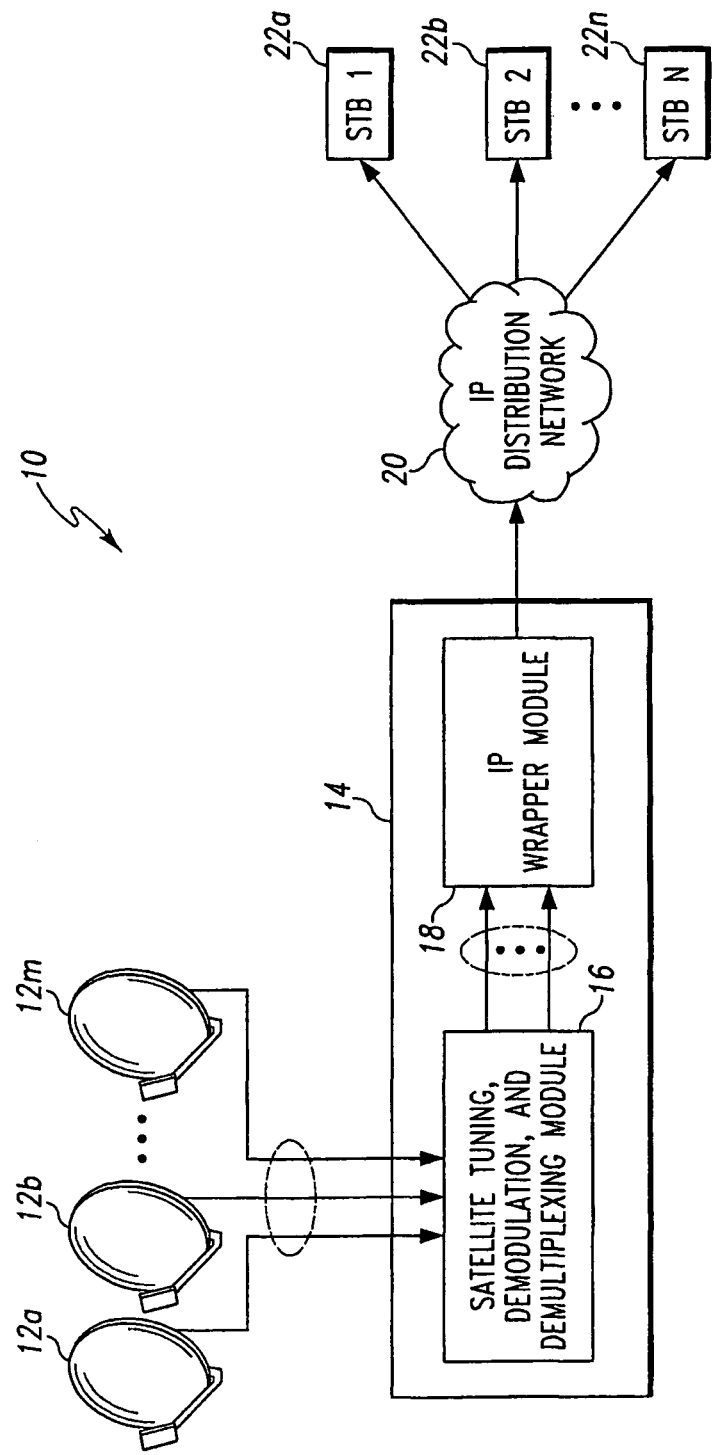
FIG. 1 is a block diagram of an exemplary satellite television over IP system in accordance with one embodiment of the present invention.

Turning to FIG. 1, a block diagram of an exemplary satellite television over IP system in accordance with one embodiment is illustrated and generally designated by a reference numeral 10. As illustrated, in one embodiment, the system 10 may include one or more satellite dishes 12*a* through 12*m*, a head-end unit, such as a satellite gateway 14, an IP distribution network 20, and one or more set top boxes ("STBs") 22*a* through 22*n*. Those of ordinary skill in the art, however, will appreciate that the embodiment of the system 10 illustrated in FIG. 1 is merely one potential embodiment of the system 10. As such, in alternate embodiments, the illustrated components of the system 10 may be rearranged or omitted or additional components may be added to the system 10. For example, with minor modifications, the system 10 may configured to distributed non-satellite video and audio services.

The system 10 may contain one or more satellite dishes 12*a*-12*m*. The satellite dishes 12*a*-12*m* may be configured to receive video, audio, or other types of television-related data that is transmitted from satellites orbiting the earth. As will be described further below, in one embodiment the satellite dishes 12*a*-12*m* are configured to receive DirecTV programming over KU band from 10.7 to 12.75 Gigahertz ("GHz"). In alternate embodiments, however, the satellite dishes 12*a*-12*m* may be configured to receive other types of direct broadcast satellites ("DBS") or television receive-only ("TVRO") signal, such as Dish Network signals, ExpressVu signals, Star-Choice signals, and the like. In still other non-satellite based systems, the satellite dishes 12*a*-12*m* may be omitted from the system 10.

In one embodiment, a low noise-block converter ("LNC") within the satellite dishes 12a-12m receives the incoming signal from the earth-orbiting satellite and converts these incoming signals to a frequency in the L band between 950 and 2150 Megahertz ("MHz"). As will be described in further detail below with regard to FIG. 2, each of the satellites 12a-12m may be configured to receive one or more incoming satellite TV signals on a particular frequency (referred to as a transponder) and with a particular polarization and to convert these satellite signals to L band signals, each of which may contain a plurality of video or audio signals.

The satellite dishes 12a-12m may be configured to transmit the L band signals to a head-end unit or gateway server, such as the satellite gateway 14. In alternate, non-satellite embodiments, the head-end unit may be a cable television receiver, a high definition television receiver, or other video distribution system.

The satellite gateway 14 includes a satellite tuning, demodulating, and demultiplexing module 16 and an IP wrapper module 18. The module 16 may contain a plurality of tuners, demodulators, and demultiplexers to convert the modulated and multiplexed L band signals transmitted from the satellites 12a-12m into a plurality single program transport streams ("SPTS"), each of which carries a service (e.g., television channel video, television channel audio, program guides, and so forth). In one embodiment, the module 16 is configured to produce a single program transport stream for all of the services received by the satellite dishes 12a-12m. In an alternate embodiment, however, the module 16 may produce transport streams for only a subset of the services received by the satellite dishes 12a-12m.

The satellite tuning, demodulating, and demultiplexing module 16 may transmit the SPTS to the IP wrapper module 18. In one embodiment, the IP wrapper module 18 repackages the data within the SPTS into a plurality of internet protocol ("IP") packets suitable for transmission over the IP distribution network 20. For example, the IP wrapper module 18 may convert DirecTV protocol packets within the SPTS into IP packets. In addition, the IP wrapper module 18 may be configured to receive server requests from the STBs 22a-22n and to multicast (i.e., broadcast to one or more of the STBs 22a-22n over an IP address) the IP SPTS to those STBs 22a-22n that had requested the particular service.

In an alternative embodiment, the IP wrapper module 18 may also be configured to multicast IP protocol SPTS for services not requested by one of the STBs 22a-22n. It should be noted that the modules 16 and 18 are merely one exemplary embodiment of the satellite gateway 14. In alternate embodiments, such as the one described below in regard to FIGS. 2 and 3, the functions of the modules 16 and 18 may be redistributed or consolidated amongst a variety of suitable components or modules.

The IP distribution network 20 may include one or more routers, switches, modem, splitters, or bridges. For example, in one embodiment, the satellite gateway 14 may be coupled to a master distribution frame ("MDF") that is coupled to an intermediate distribution frame ("IDF") that is coupled to a coax to Ethernet bridge that is coupled to a router that is coupled to one or more of the STBs 22a-22n. In another embodiment, the IP distribution network 20 may be an MDF that is coupled to a Digital Subscriber Line Access Multiplexer ("DSLAM") that is coupled to a DSL modem that is coupled to a router. In yet another embodiment, the IP distribution network may include a wireless network, such as 802.11 or WiMax network. In this type of embodiment, the STBs 22a-22n may include a wireless receiver configured to receive the multicast IP packets. Those of ordinary skill in the art will appreciate that the above-described embodiments are merely exemplary. As such in alternate embodiments, a large number of suitable forms of IP distribution networks may be employed in the system 10.

The IP distribution network 20 may be coupled to one or more STBs 22a-22n. The STBs 22a-22n may be any suitable type of video, audio, and/or other data receiver capable of receiving IP packets, such as the IP SPTS, over the IP distribution network 20. It will be appreciated the term set top box ("STB"), as used herein, may encompass not only devices that sit upon televisions. Rather the STBs 22a-22n may be any device or apparatus, whether internal or external to a television, display, or computer, that can be configured to function as described herein—including, but not limited to a video components, computers, wireless telephones, or other forms video recorder. In one embodiment, the STBs 22a-22n may be a DirecTV receiver configured to receive services, such as video and/or audio, through an Ethernet port (amongst other inputs). In alternate embodiments, the STBs 22a-22n may be designed and/or configured to receive the multicast transmission over coaxial cable, twisted pair, copper wire, or through the air via a wireless standard, such as the I.E.E.E. 802.11 standard.

Figure 2:
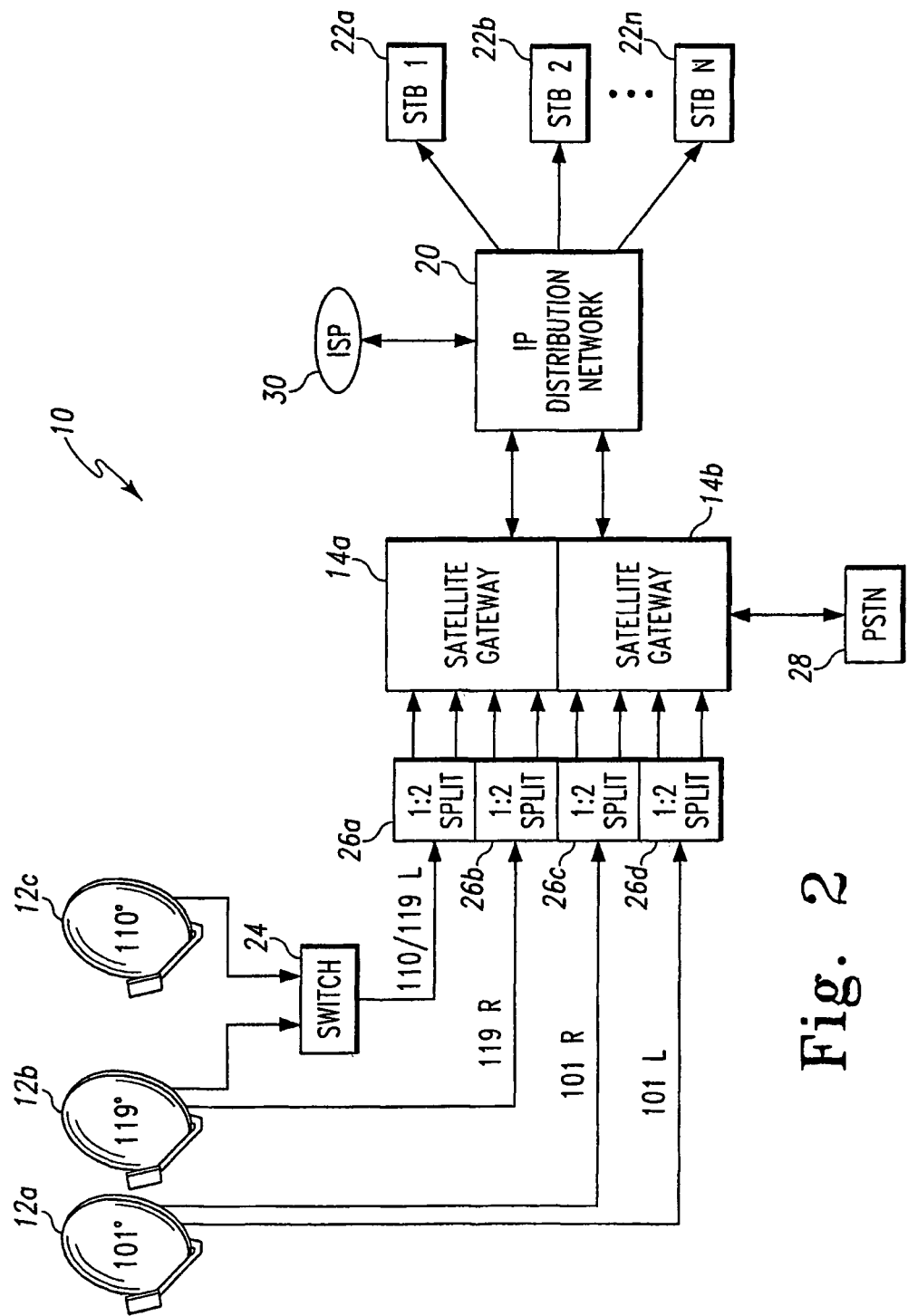
FIG. 2 is another embodiment of the exemplary satellite television over IP system illustrated in FIG. 1.

As discussed above, the system 10 may receive video, audio, and/or other data transmitted by satellites in space and process/convert this data for distribution over the IP distribution network 20. Accordingly, FIG. 2 is another embodiment of the exemplary satellite television over IP system 10 in accordance with one embodiment. FIG. 2 illustrates three exemplary satellite dishes 12a-12c. Each of the satellite dishes 12a-12c may be configured to receive signals from one or more of the orbiting satellites. Those of ordinary skill will appreciate that the satellites and the signals that are transmitted from the satellites are often referred to by the orbital slots in which the satellites reside. For example, the satellite dish 12a is configured to receive signals from a DirecTV satellite disposed in an orbital slot of 101 degrees. Likewise, the satellite dish 12b receives signals from a satellite disposed at 119 degrees, and the satellite dish 12c receives signals from a satellite disposed at orbital slot of 110 degrees. It will be appreciated that in alternate embodiments, the satellite dishes 12a-12c may receive signals from a plurality of other satellites disclosed in a variety of orbital slots, such as the 95 degree orbital slot. In addition, the satellite dishes 12a-12c may also be configured to receive polarized satellite signals. For example, in FIG. 2, the satellite dish 12a is configured to receive signals that are both left polarized (illustrated in the figure as "101 L") and right polarized (illustrated as "101 R").

As described above in regard to FIG. 1, the satellite dishes 12a-12c may receive satellite signals in the KU band and convert these signals into L band signals that are transmitted to the satellite gateway 14. In some embodiments, however, the L band signals produced by the satellite dishes 12a-12c may be merged into fewer signals or split into more signals prior to reaching the satellite gateway 14. For example, as illustrated in FIG. 2, L band signals from the satellite dishes 12b and 12c may be merged by a switch 24 into a single L band signal containing L band signals from both the satellite at 110 degrees and the satellite at 119 degrees.

As illustrated, the system 10 may also include a plurality of 1:2 splitters 26a, 26b, 26c, and 26d to divide the L band signals transmitted from the satellite dishes 12a-12c into two L band signals, each of which include half of the services of the pre-split L band signal. In alternate embodiments, the 1:2 splatters 26a-26b may be omitted or integrated into the satellite gateways 14a and 14b.

The newly split L band signals may be transmitted from the 1:2 splitters 26a-26d into the satellite gateways 14a and 14b. The embodiment of the system 10 illustrated in FIG. 2 includes two of the satellite gateways 14a and 14b. In alternate embodiments, however, the system 10 may include any suitable number of satellite gateways 14. For example, in one embodiment, the system may include three satellite gateways 14.

The satellite gateways 14a and 14b may then further subdivide the band signals and then tune to one or more services on the L band signal to produce one or more SPTS that may be repackaged into IP packets and multicast over the IP distribution network 20. In addition, one or more of the satellite gateways 14a, 14b may also be coupled to a public switch telephone network ("PSTN") 28. Because the satellite gateways 14a, b are coupled to the PSTN 28, the STBs 22a-22n may be able to communicate with a satellite service provider through the IP distribution network 20 and the satellite gateways 14a, b. This functionality may advantageously eliminate the need to have each individual STBs 22a-22n coupled directly to the PSTN 28.

The IP distribution network 20 may also be coupled to an internet service provider ("ISP") 30. In one embodiment, the IP distribution network 20 may be employed to provide internet services, such as high-speed data access, to the STBs 22a-22n and/or other suitable devices (not shown) that are coupled to the IP distribution network 20.

Figure 3:
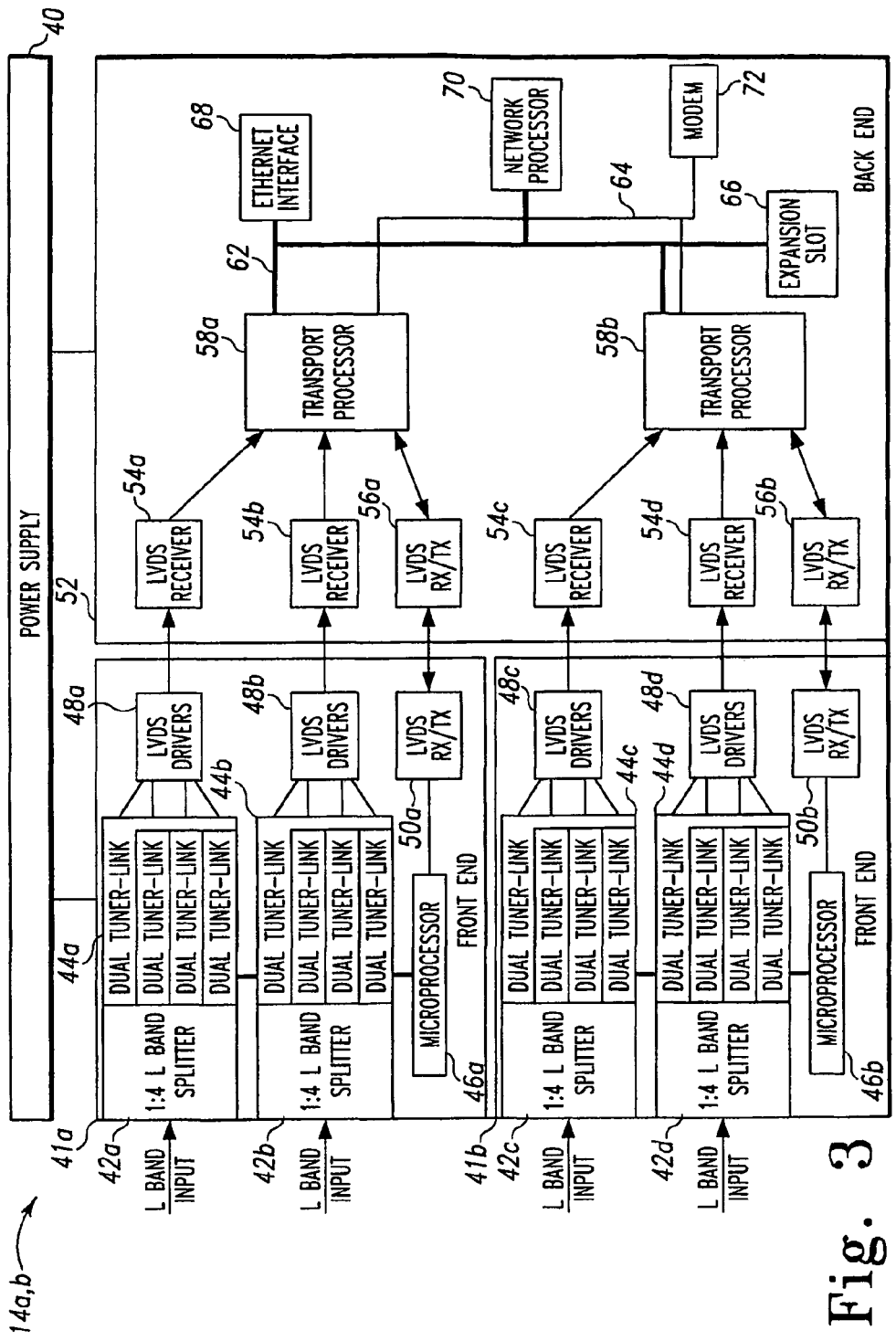
FIG. 3 is a block diagram of an exemplary satellite gateway of the present invention.

As described above, the satellite gateways 14a, b may be configured to receive the plurality of L band signals, to produce a plurality of SPTS, and to multicast requested SPTS over the IP distribution network 20. Referring now to FIG. 3, a block diagram of an exemplary satellite gateway 14 is shown. As illustrated, the satellite gateway 14a, b includes a power supply 40, two front-ends 41a and 41b and a back-end 52. The power supply 40 may be any one of a number of industry-standard AC or DC power supplies configurable to enable the front-ends 41a, b and the back-end 52 to perform the functions described below.

The satellite gateway 14a, b may also include two front-ends 41a, 25b. In one embodiment, each of the front-ends, 41a, b may be configured to receive two L band signal inputs from the 1:2 splitters 26a-26d that were described above in regards to FIG. 2. For example, the front-end 41a may receive two L band signals from the 1:2 splitter 26a and the front-end 41b may receive two L band signals from the 1:2 splitter 26b. In one embodiment, each of the L band inputs into the front-end 41a, b includes eight or fewer services.

The front-ends 41a, b may then further sub-divide the L band inputs using 1:4 L band splitters 42a, 42b, 42c, and 42d. Once subdivided, the L band signals may pass into four banks 44a, 44b, 44c, and 44d of dual tuner links. Each of the dual tuner links within the banks 44a-44d may be configured to tune to two services within the L band signals received by that individual dual tuner links to produce SPTS. Each of the dual tuner links may then transmit the SPTS to one of the low-voltage differential signaling ("LVDS") drivers 48a, 48b, 48c, and 48d. The LVDS drivers 48a-48d may be configured to amplify the transport signals for transmission to the back-end 52. In alternate embodiments, different forms of differential drivers and/or amplifiers may is be employed in place of the LVDS drivers 48a-48d. Other embodiments may employ serialization of all of the transport signals together for routing to the backend.

As illustrated, the front-ends 41a, b may also include microprocessors 46a and 46b. In one embodiment, the microprocessors 46a, b may control and/or relay commands to the banks 44a-44d of dual tuner links and the 1:4 L band splitters 42a-42d. The microprocessors 46a, b may comprise ST10 microprocessors produce by ST Microelectronics. The microprocessors 46a, b may be coupled to LVDS receiver and transmitter modules 50a and 50b. The LVDS receiver/transmitter modules 50a, b may facilitate communications between the microprocessors 46a, b and components on the back-end 52, as will be described further below.

Turning next to the back-end 52, the back-end 52 includes LVDS receivers 54a, 54b, 54c, and 54d, which are configured to receive transport stream signals transmitted by the LVDS drivers 48a-48d. The back-end 52 also includes LVDS receiver/transmitter modules 56a and 56b which are configured to communicate with the LVDS receiver/transmitter modules 50a, b.

As illustrated, the LVDS receivers 54a-54d and the LVDS receiver/transmitters 56a, b are configured to communicate with transport processors 58a and 58b. In one embodiment, the transport processors 58a, b are configured to receive the SPTS produced by the dual tuner links in the front-ends 41a, b. For example, in one embodiment, the transport processors 58a, b may be configured to produce 16 SPTS. The transport processors 58a, b may be configured to repack the SPTS into IP packets which can be multicast over the IP distribution network 20. For example, the transport processors 58a, b may repackage DirecTV protocol packets into IP protocol packets and then multicast these IP packets on an IP address to one or more of the STBs 22a-22n The transport processors 58a, b may also be coupled to a bus 62, such as a 32 bit, 66 MHz peripheral component interconnect ("PCI") bus Through the bus 62, the transport processors 58a, b may communicate with a network processor 70, an Ethernet interface 84, and/or an expansion slot 66. The network processor 70 may be configured to receive requests for services from the STBs 22a-22n and to direct the transport processors 58a, b to multicast the requested services. In one embodiment, the network processor is an IXP425 network processor produced by Intel. While not illustrated, the network processor 70 may also be configured to transmit status data to a front panel of the satellite gateway 14a,b or to support debugging or monitoring of the satellite gateway 14a, b through debug ports.

As illustrated, the transport processors 58a, b may also be coupled to the Ethernet interface 68 via the bus 62. In one embodiment, the Ethernet interface 68 is a gigabit Ethernet interface that provides either a copper wire or fiber-optic interface to the IP distribution network 20. In addition, the bus 62 may also be coupled to an expansion slot, such as a PCI expansion slot to enable the upgrade or expansion of the satellite gateway 14a, b.

The transport processors 58a, b may also be coupled to a host bus 64. In one embodiment, the host bus 64 is a 16-bit data bus that connects the transport processors 58a, b to a modem 72, which may be configured to communicate over the PSTN 28, as described above. In alternate embodiments, the modem 72 may also be coupled to the bus 62.

As described above, satellite services may be transmitted to earth as signals on the KU band. These KU band signals are each typically centered on a frequency known as a transponder. For this reason, these KU bands signals are also referred to as transponders. Each transponder may carry numerous satellite services. For example, a typical DirecTV transponder may carry between six and eight services. Each of the satellite gateways 14 may be configured to use the above described banks 44a-44d of dual-tuner links to tune to the services transmitted on each individual transponder (after the transponder is converted from the KU band to the L band by the satellite dishes 12a-12m). In some embodiments, however, there may be a limit to how many transponders each of the satellite gateways 14 may support. For example, in one embodiment, each of the satellite gateways 14 may provide coverage for between twenty four and twenty eight transponders. In alternate embodiments, the satellite gateway 14 may be able to support a different number of transponders.

To overcome this potential limitation, multiple satellite gateways 14 may be employed in combination. In another embodiment (not shown), the system 10 may employ three satellite gateways 14. In this configuration, the satellite gateways 14 may be configured to work in combination with one another. Specifically, one of the satellite gateways 14 may be programmed to act as a master satellite gateway while the remaining satellite gateways 14 are configured to act as slave satellite gateways with the master satellite gateway providing IP services (amongst other master satellite gateway management functions), such as acting as a DHCP server, controlling access to the PSTN 28, and/or controlling tuner allocation for all of the satellite gateways 14.

The master satellite gateway may also routinely share network status information, such as tuner allocation, service requests, and the like with one or more of the slave satellite gateways 14. Accordingly, if the master satellite gateway fails, one of the slave satellite gateways can automatically take over as the master satellite gateway 14. In one embodiment, the slave satellite gateway 14 with the lowest IP address assume the management functions of the master satellite gateway 14 in the event of a failure.

Because each of the satellite gateways 14 has the capability of acting as the master satellite gateway and because each of the satellite gateways 14 (if acting as the master satellite gateway) is configured to routinely share network status information, one of the slave satellite gateways can assume master satellite gateway management functions with little or no disruption in service to the STBs 22a-22n. Specifically, if the master satellite gateway fails, one of the slave satellite gateways may detect the failure, designate itself as the "new" master gateway, reassign satellite services being provided by the failed master satellite gateway, and notify the STBs 22a-22n. In various embodiments, a wide variety of suitable failure events may trigger one of the slave satellite gateways to designate itself as the new master satellite gateway. For example, a failure may be triggered if the network processor 70 (see FIG. 3) malfunctions, if one or more of the dual tuner links malfunctions, and so forth.

In one embodiment, the new master satellite gateway may also transmit a message to a network administrator, a log file, or another notification system to indicate that the original master satellite gateway 14 has failed. If the failed master satellite gateway is replaced at some point in the future with a new satellite gateway, the new satellite gateway 14 can act as a slaved satellite gateway.

As described above, in the event of a master satellite gateway failure, the "new" master satellite gateway may attempt to reassign the services being provided by the failed satellite gateway to minimize disruption to the STBs 22a-22n from the failure. In alternate embodiments, the master satellite gateway may also reassign services if one of the slave satellite gateways fails. Further, in still other embodiments, an operator of the system 10 can direct the master satellite gateway to transfer master gateway management functions and/or tuner allocations to one of the slave satellite gateways.

FIG. 4 is a chart 80 illustrating an exemplary distribution of satellite transponder coverage in accordance with one embodiment. FIG. 4 illustrates the transponders available from four different satellites: 101, 110, 119 (as described above), as well as a satellite in an orbital slot of 95 degrees. As indicated by columns 82 and 84, there are thirty two transponders available on the 101 satellite, fourteen available between the 110 and 119 satellites, and three available on the 95 satellite. With three operational satellite gateways 14, system 10 may be able to provide coverage for forty eight 101 transponders, thirty-two 110/119 transponders, and sixteen 95 transponders, easily surpassing the number of transponders available from each of the satellites, as indicated by column 86. In the event of a failure of one of the satellite gateways 14, the master satellite gateway may be able to distribute transponder coverage between the two functioning satellite gateways 14 to maintain coverage of all available transponders as indicated by column 88.

Further, even in the event of a second satellite gateway failure, the one remaining satellite gateway 14 may be able to distribute transponder coverage as shown in column 90 to provide those services most requested by the STBs 22a-22n, as indicated by block 90. As such, the master satellite gateway may be configured to routinely monitor which services are most frequently requested by the STBs 22a-22n in the event that operation that the number of satellite gateways is not sufficient to cover all of the available transponders. If this type of situation occurs, the master satellite gateway may be configured to cover the most used transponders in order of their use. For example, if a transponder Y is historically more used by the set top boxes 22a-22n, the master satellite gateway may choose to cover transponder Y instead of less-used transponder X (even if transponder X is currently being used by one of the STB 22a-22n and transponder Y is not).

Moreover, in one embodiment, such as FIG. 2, the system 10 may operate regularly with only two satellite gateways 14. While such an embodiment may not allow all services to be provided in the event of a satellite gateway 14 failure, the effects of the satellite gateway 14 failure can be reduced as described above.

Lastly, if will be appreciated that the embodiment describe with regard to FIG. 4 is merely one possible embodiment of the system 10. As such, in alternate embodiment, the satellites, transponders, or transponder coverage of each of the satellite gateways 14 may be different. For example, in one alternate embodiment, the satellite gateways 14 may each be configured to cover more transponders than indicated in FIG. 4.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system comprising:
   a first and second satellite gateway, each of the first and second satellite gateways configured to receive a predetermined maximum number of transponders and provide a plurality of television related services to a plurality of set top boxes;
   the first satellite gateway coupled to the second satellite gateway and configured to track transponder usage by the set top boxes to determine the television related services most requested by the set top boxes and to share the transponder usage with the second satellite gateway; and
   the second satellite gateway configured to automatically redistribute transponders assigned to the first satellite gateway, based on the transponder usage to cover the most used transponders in order of their use, to create a new transponder allocation if the first satellite gateway fails.

2. The system of claim 1, wherein the first satellite gateway is configured to act as a master satellite gateway and wherein the second satellite gateway is configured to assume management functions of the master satellite gateway if the first satellite gateway fails.

3. The system of claim 2, wherein the second satellite gateway is configured to assume responsibility to control tuner allocation for the system.

4. The system of claim 3, wherein the second satellite gateway is configured to assume responsibility to provide IP services to the system.

5. The system of claim 4, wherein the first satellite gateway is configured to share network status information with the second satellite gateway.

6. The system of claim 1, comprising a third satellite gateway, wherein the second satellite gateway is configured to automatically redistribute transponders assigned to the first satellite gateway amongst the second satellite gateway and the third satellite gateway.

7. The system of claim 1, wherein the second satellite gateway is configured to notify the plurality of set top boxes of the new transponder allocation.

8. The system of claim 1, comprising a plurality of satellite dishes coupled to the first satellite gateway and the second satellite gateway.

9. A method comprising:
receiving a predetermined maximum number of transponders at each of a first satellite gateway and a second satellite gateway, each of the first satellite gateway and the second satellite gateway configured to provide a plurality of television related services to a plurality of set top boxes;
tracking, at the first satellite gateway, transponder usage by the set top boxes to determine the television related services most requested by the set top boxes;
sharing the transponder usage with the second satellite gateway;
detecting that the first satellite gateway has failed;
automatically redistributing satellite transponders assigned to the first satellite gateway to at least the second satellite gateway, based on the transponder usage to cover the most used transponders in order of their use, to create a new transponder allocation; and
notifying the plurality of set top boxes about the new transponder allocation.

10. The method of claim 9, wherein automatically redistributing comprises automatically redistributing the satellite transponders amongst the second satellite gateway and a third satellite gateway.

11. The method of claim 9, comprising sharing network status information between the first satellite gateway and the second satellite gateway.

12. The method of claim 9, comprising transferring master satellite gateway management functions from the first satellite gateway to the second satellite gateway.

13. The method of claim 12, wherein transferring master satellite gateway management functions comprises transferring master satellite gateway management functions when the first satellite gateway fails.

14. The method of claim 13, wherein transferring master satellite gateway management functions comprises transferring control over tuner assignment to the second satellite gateway.

15. The method of claim 9, wherein automatically redistributing satellite transponders comprises automatically redistributing direct broadcast satellite signal transponders.

16. A system comprising:
means for receiving a predetermined maximum number of transponders at each of a first satellite gateway and a second satellite gateway, each of the first satellite gateway and the second satellite gateway configured to provide a plurality of television related services to a plurality of set top boxes;
means for tracking, at the first satellite gateway, transponder usage by the set top boxes to determine the television related services most requested by the set top boxes;
means for sharing the transponder usage with the second satellite gateway;
means for detecting that the first satellite gateway has failed;
means for automatically redistributing satellite transponders assigned to the first satellite gateway to at least the second satellite gateway, based on the transponder usage to cover the most used transponders in order of their use, to create a new transponder allocation; and
means for notifying the plurality of set top boxes about the new transponder allocation.

17. The system of claim 16, comprising means for redistributing the satellite transponders amongst the second satellite gateway and a third satellite gateway.

18. The system of claim 16, comprising means for sharing network status information between the first satellite gateway and the second satellite gateway.

19. The system of claim 16, comprising means for transferring master satellite gateway responsibilities from the first satellite gateway to the second satellite gateway.

* * * * *